US007911975B2

(12) United States Patent
Droz et al.

(10) Patent No.: US 7,911,975 B2
(45) Date of Patent: Mar. 22, 2011

(54) SYSTEM AND METHOD FOR NETWORK FLOW TRAFFIC RATE ENCODING

(75) Inventors: Patrick Droz, Rueschlikon (CH); Paul Hurley, Zurich (CH); Andreas Kind, Kilchberg (CH); Marc Stoecklin, Basel (CH)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 12/198,747

(22) Filed: Aug. 26, 2008

(65) Prior Publication Data
US 2010/0054151 A1 Mar. 4, 2010

(51) Int. Cl.
*H04L 12/28* (2006.01)
(52) U.S. Cl. .......................................... 370/254; 370/252
(58) Field of Classification Search .................. 370/252, 370/201, 230, 352, 84, 254; 704/201
See application file for complete search history.

(56) References Cited

U.S. PATENT DOCUMENTS

| | | | | |
|---|---|---|---|---|
| 5,400,329 | A * | 3/1995 | Tokura et al. | 370/232 |
| 5,890,105 | A * | 3/1999 | Ishihara et al. | 704/201 |
| 2003/0112796 | A1* | 6/2003 | Kwan | 370/352 |
| 2006/0239203 | A1* | 10/2006 | Talpade et al. | 370/252 |
| 2007/0153689 | A1* | 7/2007 | Strub et al. | 370/230 |
| 2007/0211647 | A1* | 9/2007 | Hao et al. | 370/254 |
| 2008/0027711 | A1* | 1/2008 | Rajendran et al. | 704/201 |

OTHER PUBLICATIONS

"Cicso IOS NetFlow", http://www.cisco.com/en/US/products_ios_protocol_group_home.html, pp. 1-2, last printed Aug. 27, 2008.
"IP Flow Information Export", http://en.wikipedia.org/wiki/IP_Flow_Information_Export , pp. 1-4, last printed Aug. 27, 2008.

* cited by examiner

*Primary Examiner* — Kwang B Yao
*Assistant Examiner* — Syed M Bokhari
(74) *Attorney, Agent, or Firm* — Scully, Scott, Murphy & Presser, P.C.; Stephen C. Kaufman, Esq.

(57) ABSTRACT

A system and method for monitoring packetized traffic flow in a network and enabling approximation of the rate information of a network flow. The method for monitoring network traffic flow includes receiving, at a network packet flow collector device, packetized traffic flow signals to be monitored; sampling said received packetized traffic flow signals in time to form an approximation of the packet flow rate in time; generating packet flow activity data comprising data representing the sampled traffic flow signals sampled in time; communicating the packet flow activity data to a network packet flow analyzer device and processing the flow activity data to form signals representing an approximate version of the network traffic flow in the network, the analyzer processing the traffic flow signals for reconstructing the rate of the netflow as a function of time. The flow analyzer then generates a compressed version of the network traffic flow signals in the network, the compressed network traffic flow signals comprising relevant approximation of the packet flow rate in time.

18 Claims, 3 Drawing Sheets

SYSTEM AND METHOD FOR NETWORK FLOW TRAFFIC RATE ENCODING

BACKGROUND OF THE INVENTION

1. Field of the Invention

The invention relates generally to measurement processes and subsequent electronic manipulation, archiving or aggregation of data, and more particularly, to improved system and method for measuring, collecting, aggregating and transmitting network flow data.

2. Description of the Prior Art

Analysis and visualization of network traffic is important for optimizing and protecting the operation of networked IT infrastructures.

Standard transmission of the activity of a network flow, from the de-facto standard "netflow" (see, e.g., http://www-.cisco.com/warp/public/732/Tech/nmp/netflow/index.shtml incorporated by reference herein) and the IETF standard IPFIX (see, e.g., http://en.wikipedia.org/wiki/IP Flow Information Export incorporated by reference herein), consists solely of the start and end time of the flow, and how many bytes and packets from this flow that were observed. This information is minimal—only the average rate at which the flow sent is known, with no knowledge as to whether these packets occurred at the beginning or the end. This limits dramatically the usefulness of Netflow data for extrapolating activity on a link or for using it in dimensioning.

For example, IBM's Aurora product (See, e.g., http://aurora.zurich.ibm.com) uses netflow packets to show activity. It, however, must assume that each flow sent at its average rate (or some other crude extrapolation). This necessarily results in errors in the accuracy of the reported traffic activity as a function of time.

For example, via Aurora, only the average rate at which a flow sends is known, which may be an inaccurate gauge of activity if the rate varied a lot during that time period (i.e., high variance). For example, as shown in FIG. 1, there is depicted a plot 10 showing network packet flow 12 that had a lot of activity not reflected in its average rate depicted as a line 15 as would be output by the conventional analyzer.

That is, Netflow's activity monitor's effectiveness is thus curtailed.

Users of the netflow and like network packet traffic monitoring systems would benefit from a scheme that provides more accurate information of a flow's activity within a network.

SUMMARY OF THE INVENTION

The present invention builds upon the netflow collection and analyzer systems to improve the reporting activity of packet network flows.

Particularly, the invention is a system and method for enabling the traffic pattern of a flow of network packets to be disseminated from a flow exporter to a collector. By making use of signal processing techniques this dissemination is achieved such that there is minimum overhead and that as a flow's duration increases, it smoothly adjusts how the activity is reported (low-frequency or high-frequency components of the signal).

Moreover, the system and method of the invention increases dramatically the amount of detail known about the activity of a flow with low additional overhead.

Thus, in one aspect of the invention, there is provided a network traffic flow monitor system comprising:

a network packet flow collector device for receiving packetized traffic flow signals via a network connection to be monitored and generating packet flow activity data, the flow activity data comprising data representing traffic flow signals sampled in time to form an approximation of the packet flow rate in time; and, a network packet flow analyzer device for receiving the flow activity data and processing the flow activity data to form signals representing an approximate version of the network traffic flow in the network, the analyzer processing the traffic flow signals for reconstructing the rate of the netflow as a function of time.

In one embodiment, the invention utilizes an efficient filter-bank based method at the netflow collector and netflow analyzer devices. This filter bank has a small fixed storage with which to represent the signal. The netflow analyzer is aware of the basis used by the collector and can thus reconstruct the rate of the netflow as a function of time. More particularly, the netflow analyzer is aware of the basis functions (i.e., elements of the basis (a set of vectors that, in a linear combination, can represent every vector in a given vector space) for a function space) used by the collector and can thus reconstruct the rate of the netflow as a function of time.

The invention is to be used in a traffic collector which generates netflow packets for receipt by the analyzer. According to one aspect of the invention, the system and method of the invention enables manipulation of data in a time and space efficient manner that previously did not exist.

In a further aspect of the invention, the system and method of the present invention enables manipulation of data in a time and space efficient manner fixes a problem in the limitation of network flow collector mechanisms.

More specifically, the invention enables network flow collection rate information data to be incrementally compressed and transmitted efficiently such that the transmitted flow rate information is extremely accurate with minimal data size.

According to a further aspect of the present invention, there is provided a method and computer program product for monitoring network traffic flow. The method for monitoring network traffic flow comprises:

receiving, at a network packet flow collector device, packetized traffic flow signals to be monitored;

sampling the received packetized traffic flow signals in time to form an approximation of the packet flow rate in time;

generating packet flow activity data comprising data representing the sampled traffic flow signals sampled in time;

communicating the packet flow activity data to a network packet flow analyzer device and processing the flow activity data to form signals representing an approximate version of the network traffic flow in the network, the analyzer processing the traffic flow signals for reconstructing the rate of the netflow as a function of time.

Further to this aspect of the invention, there is additionally implemented the steps of:

providing, at the network packet flow collector device, a filter device for converting the sampled traffic flow signals in time into basis coefficient information based on the configuration of the filter device, the flow activity data including the basis coefficient information; and, configuring a synthesis filter device, at the flow analyzer device, in response to the basis coefficient information received from the flow activity data, for processing the approximate network traffic flow signals for reconstructing the rate of the netflow as a function of time.

Moreover, the filter device generates a compressed version of said network traffic flow signals in said network, said compressed network traffic flow signals comprising relevant approximation of said packet flow rate in time.

Moreover, further to this aspect of the invention, there is additionally provided the step of configuring the filter and synthesis filter devices according to a type of network flow activity data the network packet flow analyzer device is targeting.

Yet further according to this aspect of the invention, there is provided a step for adapting the netflow signal according to a received network packet flow length, the network packet flow collector device adapting the basis coefficient data of the filter device according to the network packet flow duration.

BRIEF DESCRIPTION OF THE DRAWINGS

The foregoing and other objects, aspects and advantages will be better understood from the following detailed description of embodiments of the inventions, with reference to the drawings, in which.

DETAILED DESCRIPTION OF THE PREFERRED EMBODIMENT

As will be referred to herein, the term network flow collector (e.g., IBM Hespera product) denotes the entity that processes traffic and generates netflow, IPFIX, or any other flow collection protocol, whereby traffic is classified into flows and these flows' activity recorded. Similarly, the term flow analyser (e.g., IBM's Aurora product) denotes the entity that receives the flow data and uses it for such purposes as displaying traffic activity.

These netflow traffic monitoring system uses new techniques for collecting, storing, and analyzing flow-based network traffic information. The system helps to gain tight control over end-to-end resource usage for hosts, servers, services, applications, protocols, domains, autonomous systems, QoS types, and switch interfaces. The system operates passively by generating detailed network traffic reports from NetFlow/IPFIX and is specifically designed for high flow rates.

The present invention, in one embodiment, builds upon known network traffic profiling techniques and, in particular, IBM's Hespera and Aurora products. However, the invention is not so limited and may be implementable in other Netflow/IPFIX implementations.

Figure 2:
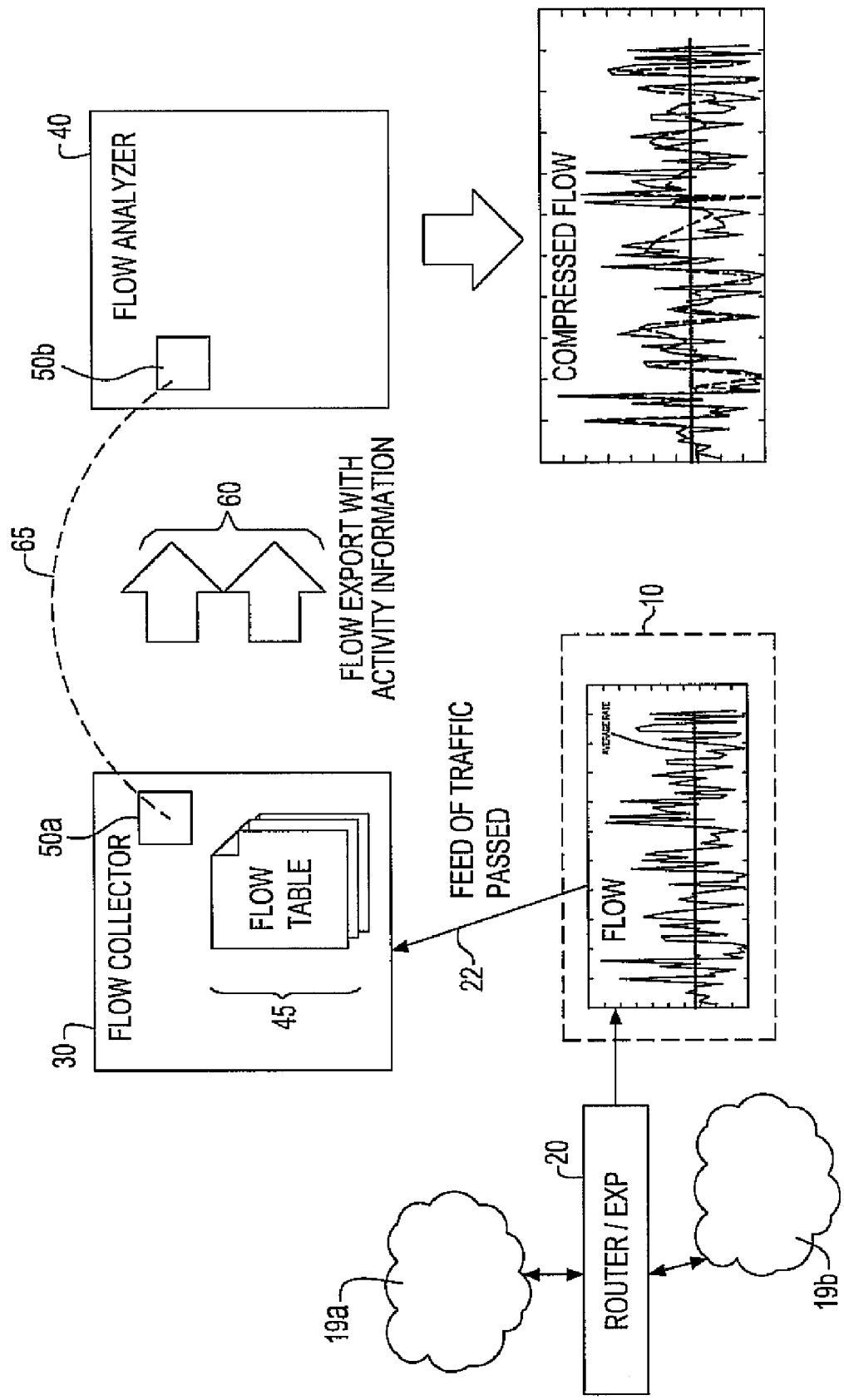
FIG. 2 illustrates a conceptual flow diagram 20 depicting the method steps of the improved netflow in accordance with the system and method of the present invention.

FIG. 2 depicts an example Netflow protocol (e.g., NetFlow V.9 implementation) enhanced according to the present invention. The improved network traffic profiling system according to the invention include a router device 20 attached to networks 19a, 19b, which may include LANs, WANs, public Internet or private intranet, etc., that generates netflow records including network flow activity data and exports them as packets, e.g., in accordance with User Datagram Protocol (UDP), Stream Control Transmission Protocol (SCTP) or like packet transmission protocols, to a netflow collector device 30 where they are collected and flow activity data recorded. In one embodiment, the router/exporter 20 outputs a flow record when it determines that the flow is finished. The netflow records and activity data collected are further exported to the analyzer device 40 where the network flow data is analyzed, and, where a picture of traffic flow and traffic volume in a network is generated. While network flows may be defined in many ways, network flow may comprise a series of packets all sharing all of the following values including, but not limited to one or more of the following: Source IP address, Destination IP address, Source port (for example UDP or TCP port), Destination port (for example UDP or TCP port), IP protocol, Ingress interface, IP Type of Service.

The NetFlow record itself includes information about the traffic in a given flow. Such netflow record information may include, but is not limited to: a Netflow protocol Version number, Sequence number, Input and output interface indices used by SNMP (ifIndex in IF-MIB), timestamps for the flow start and finish time, in milliseconds since the last boot, number of bytes and packets observed in the flow, Layer 3 headers including: Source & destination IP addresses, Source and destination port numbers, IP protocol and Type of Service (ToS) value.

As further shown in FIG. 2, in one aspect of the invention, is the provision of one or more filter banks 50a shown in FIG. 2 that receive and filter the packet netflow feed 22, via the router 20 in the embodiment depicted, and generates basis values for adapting the netflow packet as reported by the netflow collector device 30. Thus, according to one embodiment of the present invention, data that is intended to be stored in a flow table 45 of the flow collector 30, now includes the basis values as determined by the adapting filter bank 50a, i.e., the analysis filter bank output values which, as will be described in greater detail herein, comprises basis coefficients for the basis functions implemented by the filters. This flow table data in prior embodiments included typically time-based flow activity data, storing the total number of packets and bytes the particular monitored flow had, and/or further includes bucketized data wherein counter devices of associated bins or storage "buckets" (not shown) records the number of bytes that occurred in a particular time interval. Preferably, the basis value data now stored in flow activity table 45 results in virtually none or negligible bit storage and transmission overhead. More particularly, with the processing by filter bank 50a, the activity information recorded is equal to the signal of the flow's arrival rate at the netflow collector device 30. However, the processing by filter banks 50a, and, the corresponding synthesis filter bank 50b at the netflow analyzer 40, incrementally compresses the activity rate in accordance with the way the filter banks 50a and synthesis filter bank 50b are configured, and the adjustments to the duration of the flow.

Thus, in one example implementation, a filter-bank 50a associated with the netflow collector 30 is used and updated upon each entry. As will be explained in greater detail herein, filter-banks 50a are provided at the collector and synthesis filter bank 50b associated with the netflow flow analyzer 40 are configured, i.e., tailored, according to the statistical nature of the traffic. A filter-bank output is a representation of the flow signal. More particularly, the outputs of the netflow filter bank 50a are the basis coefficients that describe the netflow signal being received and these are returned with the activity information flows export 60 to the synthesis filter bank 50b at netflow analyzer module 40 as shown in FIG. 2. If no packets are dropped it is a lossless representation and can be reversed.

In the manner described, the filter banks adapt the netflow signal to flow length. For example, the output of the filter-bank 50a can be manipulated as necessary, i.e. deleting some of the basis coefficients to account for the increased length of the flow.

That is, the filters used in the filter-banks 50a,b are configured so that they work better with the type of traffic under analysis. This may take the form of matching the traffic to a traffic model and using "ideal" filters for a particular traffic model. In this manner, a fixed amount of space can be allocated to a Flow Information packet (a "netflow") and this can be filled up differently depending on the flow duration, i.e., the amount of time the flow exists for (i.e., how long). The allocated space is a fixed amount of bits that it is filled by the output of the collector netflow filter-bank 50a. Without restricting the invention in any way, in one embodiment, the maximum fixed size of space has a size M (bits) per flow-entry. Thus, for the longer flow duration example, will result in using less of the "high-frequency" outputs of the filter-bank. That is, the longer a flow lasts, the more output there normally is out of a filter bank. If a fixed amount of space is provided, some of the filter bank coefficients must be dropped for longer flows, and thus, is a benefit of the invention. No previous netflow collector device exists that gathers flow information and then sends a compressed version to the analyzer processing module 40 as shown in FIG. 2. The flow analyzer 40 then, from the received basis coefficient information exported by the collector, reconstructs the signal by implementing the synthesis filter-bank 50b, shown in FIG. 2.

In one embodiment, the filter bank 50a may comprise a multi-level, two-channel filter bank, although the invention is in no way limited as such. It is within the purview of skilled artisans to implement multiple-channel filter banks.

In a further embodiment, the netflow analyser device 40 and netflow collector 30 each agree and are pre-programmed in like manner via signals 65 as shown in FIG. 2, on a pre-set configuration for collecting flow rate data. This permits the flow analyser 40 to tailor the collector 30 to the type of data the analyser is most interested in. In such an embodiment, there is implemented a Netflow template 60, or may be implemented by changing Simple Network Management Protocol (SNMP) variables at the collector, or through control-plane mechanisms such as Forwarding and Control Element Separation (Forces) that standardize information exchange between the control and forwarding planes.

Figure 1:
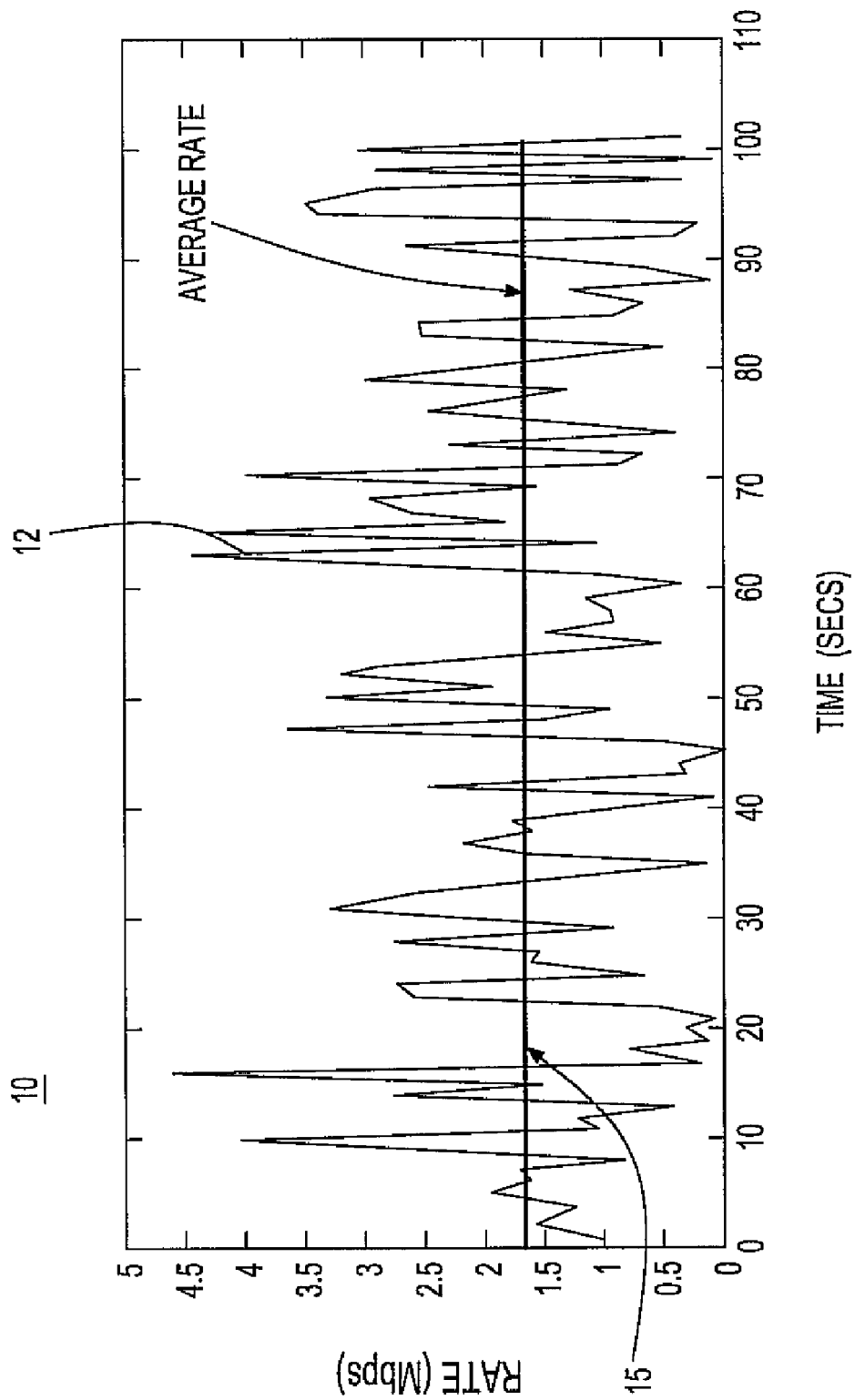
FIG. 1 illustrates an example flow whose activity as obtained by conventional Netflow analysis that is only captured as an average rate.
Figure 3:
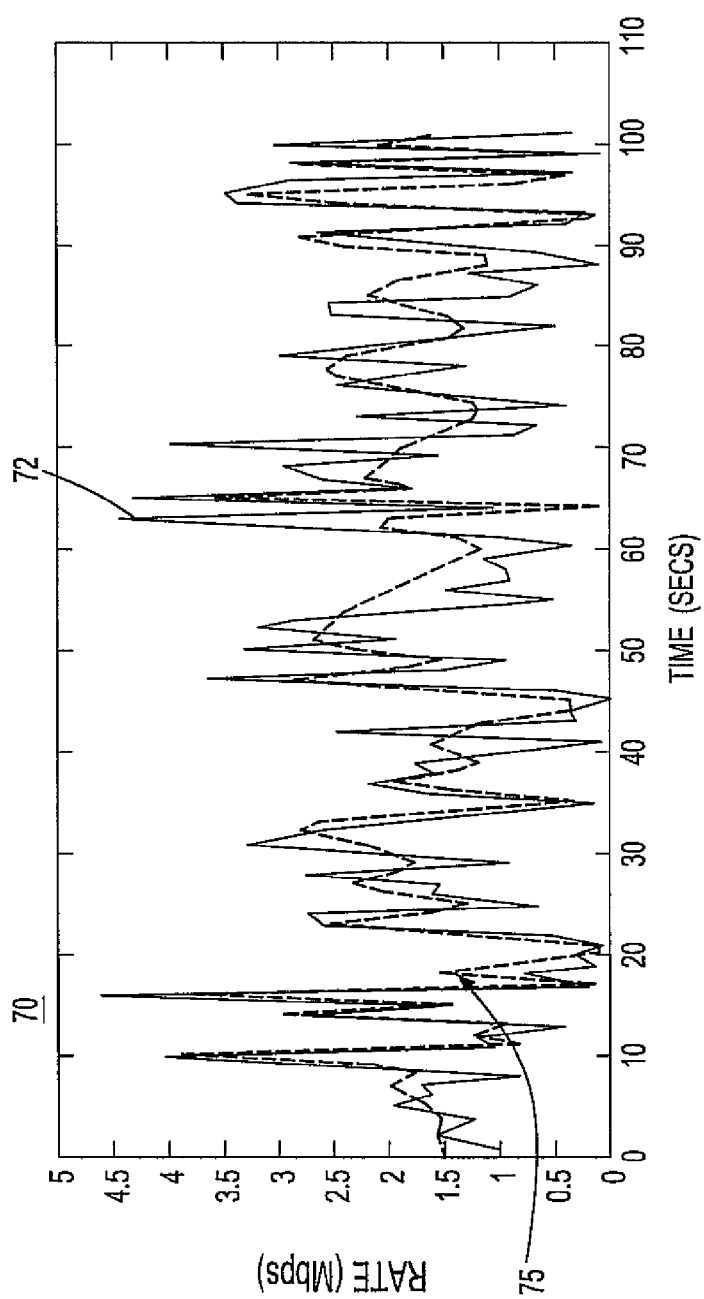
FIG. 3 illustrates an example presentation of flow activity processed according to the improved netflow analysis technique that provides transmitted flow rate information exhibiting improved accuracy according to the present invention; and, FIG. 4 illustrates an example implementation of a two channel analysis and synthesis filter bank according to one embodiment of the present invention.

FIG. 3 shows, by way of example, a plot 70 of the netflow versus time how the flow rate 72 monitored at the network flow collector (equivalent to the flow rate 12 shown in FIG. 1) can be tracked by an embodiment of the invention, and reconstructed to provide a more useful representation 75 of the underlying real flow activity 72 of the network or router feed. FIG. 3 particularly depicts the recovery of the flow rate, i.e., the decompressed version of the flow obtained from application of the synthesis filter-bank 50b using 15 basis coefficient values from the filter banks, for example.

In a further embodiment of the invention, a quantization step is performed whereby lossless compression of coefficients is incorporated before transmission of the netflow packets to the analyzer. As known, quantization is the step of mapping the basis coefficients into a certain value range, e.g., in order to compress resultant filter output values. The output of a filter bank may be pre-processed at the netflow collector by quantization before sending, using a quantizer or form of quantizer device.

The data can be thus quantized to a certain value range and a thresholding procedure, may be applied where all values of the transform that are close to 0 (or below some value T) are set to 0. The last (optional) stage, entropy coding, is also lossless compression of the quantized coefficients using, for example, Huffman or arithmetic coding. Alternately, the invention need not implement an entropy coding step at all—it is then faster, simpler while data manipulation becomes more convenient.

In a further alternate embodiment, after the transform coding is performed, there is formed a basis decomposition of the signal.

Thresholding amounts to setting all basis coefficients to zero which are below some value T, which is equivalent to dropping these basis coefficients.

Figure 4:
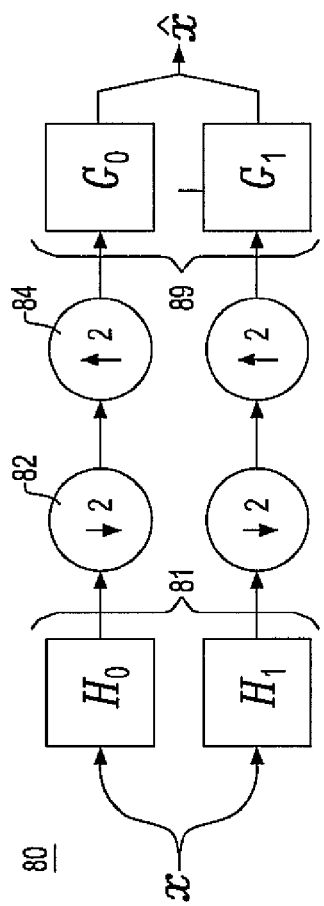

The use of filter banks 50a, 50b in accordance with the present invention is now described in greater detail with respect to FIG. 4. In one implementation, a filter bank may comprise either finite impulse response (FIR) or infinite impulse response (IIR) filter. According to the invention, each filter outputs basis coefficients with some coefficients containing more of the energy of the signal than others. This is useful in the case of netflow signal because for some applications, it is advantageous to adapt the percentage of compression used for longer lasting flows.

Filter banks and basis expansions are intertwined. In particular, a basis expansion can be obtained using a number of filters in harmony. A filter is defined to be a linear time-variant operator and in operates in conjunction with a downsampler mechanism that reduces the sampling rate of a signal (i.e., reduces the data rate/size). For example, a downsampler with integer factor N outputs every Nth value of the input e.g. if $x=(x[0], \ldots, x[n])$, then a downsampler with factor 2 outputs $(x[0], x[2], x[4], x[6], \ldots)$. The filter additionally operates in conjunction with an upsampler mechanism that increases the sampling rate of a signal (i.e., increases signal resolution). Thus, an upsampler with integer factor M inserts M−1 consecutive zeros in between samples of the input e.g. if $x=(x[0], x[1], \ldots,)$; thus, an upsampler with factor 3 outputs $(x[0], 0, 0, x[1], 0, 0, x[2], 0, 0, \ldots)$.

The filter banks 50a, 50b implemented according to the invention is now described herein with respect to FIG. 4. In FIG. 4 there is depicted an example two channel filter bank implementation 80 that includes a set of filters including additional downsampling and/or upsampling operators 82, 84 respectively. One channel includes an analysis filter bank 81, and the second a synthesis filter bank 89. The two parts of the analysis filter bank filter and then downsample the input signal $\chi$. In one implementation, both operations may be performed together, i.e., in one efficient operation.

The filter set {H0,H1,G0,G1} is suitably chosen such that, provided there is no further manipulation of the output signal $\chi$, the original signal $\chi$ can be exactly reconstructed i.e., $x=\hat{x}$ (allowing for a time-delay determined by the length of the filters and within the restrictions of potential round-off error in computer calculations). The filter bank 80 then becomes a perfect reconstruction filter bank. This requires that the filters be biorthogonal as perfect reconstruction filter banks are a preferred implementation.

Filters that satisfy this criteria include orthogonal filters generated from wavelets (i.e., mathematical functions used to divide a given function or continuous-time signal into different frequency components wherein each component may be studied with a resolution that matches its scale), wavelet packets and local cosine bases. The invention is not restricted to any particular filter. In any case, the best filters will depend on the application and the nature of the input data.

The netflow traffic rate encoding system and method of the invention that provides a mechanism for approximating the rate information of a network flow provides for additional, non-exhaustive, advantages. Many variations and relaxations are possible, which remain within the concept, scope, and spirit of the invention, and would be clear to those skilled in the art.

Bounded size The size of the data transmitted from analyser to collect is fixed so as not to exceed some predetermined size M. This value can be specified in any typical storage unit (e.g. bytes).

Adaptive The adaptive nature of the invention to the duration of a flow—whereby the coefficients stored at the collector adapt as the flow continue to be adjusted—provides a smooth way for flows to be analyzed.

Statistical Property Preservation The mean of the data sample will be (approximately) the same whether calculated on the original, lossless data, or on the result of the lossy decompression.

Wide scope The invention handles, efficiently, time-series with varying statistical properties, including those with non-stationarity.

Estimates By its layered nature, the invention enables one to obtain quick estimates of data properties without traversing the stored data set. Further refinement of the results can also then be obtained.

Although the embodiments of the present invention have been described in detail, it should be understood that various changes and substitutions can be made therein without departing from the spirit and scope of the inventions as defined by the appended claims. Variations described for the present invention can be realized in any combination desirable for each particular application. Thus, particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded into a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

What is claimed is:

1. A network traffic flow monitor system, comprising:
    a network packet flow collector device for receiving netflow packets associated with a flow of packets at a network connection and generating traffic flow activity data, said traffic flow activity data comprising data used to calculate an associated packet flow rate as a function of time;
    a filter device, at said flow collector device, configured to generate basis coefficient information from said received netflow packets associated with said flow, said traffic flow activity data including said basis coefficient information;
    a network packet flow analyzer device for receiving said traffic flow activity data and processing said traffic flow activity data to form signals representing an approximated packet flow rate in time;
    a synthesis filter device, at said flow analyzer device, responsive to said basis coefficient information received from said flow activity data to configure said synthesis filter device to process said formed signals and reconstruct the associated packet flow rate as a function of time, and,
    wherein said filter device adapts the netflow packets according to a received network packet flow duration, said network packet flow collector device adapting said basis coefficient data of said filter device according to said network packet flow duration, whereby a reporting of network packet flows is improved.

2. The network traffic flow monitor system as claimed in claim 1, wherein said approximation of said packet flow rate in time comprises a compressed version of said network traffic flow signals.

3. The network traffic flow monitor system as claimed in claim 1, further comprising:
    a storage device having a fixed amount of storage space at said network packet flow collector device for storing said basis coefficient information prior to said communicating to said network packet flow analyzer device.

4. The network traffic flow monitor system as claimed in claim 1, wherein said filter and synthesis filter devices are configured according to a type of network flow activity data the network packet flow analyzer device is targeting.

5. The network traffic flow monitor system as claimed in claim 1, wherein said filter and synthesis filter device each includes a bank of filters, each filter bank including one or more:
    downsampler device for reducing the sampling rate of received netflow packets associated with said flow; and,
    upsampler device for increasing the sampling rate of said received netflow packets associated with said flow.

6. The network traffic flow monitor system as claimed in claim 5, wherein said downsampler device initiates deleting one or more said basis coefficients to account for the increased packet flow duration lengths.

7. The network traffic flow monitor system as claimed in claim 5, wherein said filter and synthesis filter devices each comprise a perfect reconstruction filter bank.

8. The network traffic flow monitor system as claimed in claim 1, further comprising: quantizer device for mapping the filter device generated basis coefficients into a predetermined value range, wherein said basis coefficients outputs of said filter devices are pre-processed before being provided to said network packet flow analyzer device.

9. The network traffic flow monitor system as claimed in claim 1, wherein said receiving of said netflow packets is adjusted so decreased detailed information is communicated for long packet flow duration, and increased detailed information for shorter packet flow duration.

10. A method for monitoring network traffic flow comprising:
   receiving, at a network packet flow collector device, netflow packets associated with a flow of packets at a network connection to be monitored;
   generating, from received netflow packets, traffic flow activity data comprising data used to calculate an associated packet flow rate as a function of time;
   sampling said received netflow packets in time to form an approximation of said packet flow rate in time;
   providing, at said network packet flow collector device, a filter device for generating basis coefficient information from said received netflow packets associated with said flow, said traffic flow activity data including said basis coefficient information; and,
   communicating said traffic flow activity data to a network packet flow analyzer device for receiving said traffic flow activity data and processing said traffic flow activity data to form signals representing an approximated packet flow rate in time; and
   configuring, at said flow analyzer device, a synthesis filter device in response to said basis coefficient information received from said traffic flow activity data to process said formed signals and reconstruct the associated packet flow rate as a function of time,
   wherein the netflow packets are adapted according to a received network packet flow duration, said network packet flow collector device adapting said basis coefficient data of said filter device according to said network packet flow duration whereby a reporting of network packet flows is improved.

11. The method as claimed in claim 10, wherein said filter device generates a compressed version of said network traffic flow signals in said network, said compressed network traffic flow signals comprising relevant approximation of said packet flow rate in time.

12. The method as claimed in claim 10, further comprising: providing, at said network packet flow collector device, a storage device having a fixed amount of storage space for storing said basis coefficient information and additional network flow activity data prior to said communicating to said network packet flow analyzer device.

13. The method as claimed in claim 10, further comprising:
   configuring said filter and synthesis filter devices according to a type of network flow activity data the network packet flow analyzer device is targeting.

14. The method as claimed in claim 10, further comprising, performing one or more or combination of:
   reducing, by one or more downsampler devices implemented at each said filter and synthesis filter device, the sampling rate of received netflow packets associated with said flow; and,
   increasing, by one or more upsampler devices implemented at each said filter and synthesis filter device, the sampling rate of said received netflow packets associated with said flow.

15. The method as claimed in claim 14, further comprising:
   deleting, by said downsampler device, one or more said basis coefficients to account for the increased packet flow duration lengths.

16. The method as claimed in claim 14, further comprising:
   pre-processing said basis coefficients outputs of said filter devices before being provided to said network packet flow analyzer device, said pre-processing comprising mapping the filter device generated basis coefficients into a predetermined value range.

17. The method as claimed in claim 10, wherein said receiving said netflow packets is adjusted so decreased detailed information is communicated for long packet flow duration, and increased detailed information for shorter packet flow duration.

18. A computer program product for monitoring network traffic flow, the computer program product comprising a non-transitory storage device readable by a processing circuit and storing instructions run by the processing circuit for performing a method, the method comprising: receiving, at a network packet flow collector device, netflow packets associated with a flow of packets at a network connection to be monitored; generating, from received netflow packets, traffic flow activity data comprising data used to calculate an associated packet flow rate as a function of time; sampling said received netflow packets in time to form an approximation of said packet flow rate in time; providing, at said network packet flow collector device, a filter device for generating basis coefficient information from said received netflow packets associated with said flow, said traffic flow activity data including said basis coefficient information; communicating said traffic flow activity data to a network packet flow analyzer device for receiving said traffic flow activity data and processing said traffic flow activity data to form signals representing an approximated packet flow rate in time; and configuring a synthesis filter device, at said flow analyzer device, in response to said basis coefficient information received from said traffic flow activity data, to process said formed signals and reconstruct the associated packet flow rate as a function of time, wherein the netflow packets are adapted according to a received network packet flow duration, said network packet flow collector device adapting said basis coefficient data of said filter device according to said network packet flow duration whereby a reporting of network packet flows is improved.

* * * * *